United States Patent
Yeo et al.

(10) Patent No.: US 8,018,642 B2
(45) Date of Patent: Sep. 13, 2011

(54) ELECTRO-OPTICAL DISPLAY

(75) Inventors: Jong-Souk Yeo, Corvallis, OR (US); Gregg Alan Combs, Monmouth, OR (US); Jeffrey Todd Mabeck, Corvallis, OR (US); Tim R. Koch, Corvallis, OR (US); Pavel Kornilovich, Corvallis, OR (US); Donald Milton Hill, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/411,828

(22) Filed: Mar. 26, 2009

(65) Prior Publication Data

US 2010/0245981 A1    Sep. 30, 2010

(51) Int. Cl.
    *G02B 26/00* (2006.01)
(52) U.S. Cl. ...................................................... 359/296
(58) Field of Classification Search .................. 359/296, 359/265–275; 345/105, 107, 45, 84; 430/32, 430/34, 38; 204/600, 450
See application file for complete search history.

(56) References Cited

U.S. PATENT DOCUMENTS

| | | | |
|---|---|---|---|
| 3,668,106 A | 6/1972 | Ota | |
| 4,203,106 A | 5/1980 | Dalisa et al. | |
| 6,130,774 A | 10/2000 | Albert et al. | |
| 6,151,096 A * | 11/2000 | McDonnell et al. | 349/188 |
| 6,574,034 B1 | 6/2003 | Lin et al. | |
| 6,577,433 B1 | 6/2003 | Lin et al. | |
| 6,741,385 B2 | 5/2004 | Ikeda et al. | |
| 6,781,745 B2 | 8/2004 | Chung et al. | |
| 6,822,783 B2 | 11/2004 | Matsuda et al. | |
| 7,123,238 B2 | 10/2006 | Lin et al. | |
| 7,283,119 B2 * | 10/2007 | Kishi | 345/107 |
| 7,408,699 B2 | 8/2008 | Wang et al. | |
| 7,433,113 B2 | 10/2008 | Chopra et al. | |
| 7,440,159 B2 | 10/2008 | Yang et al. | |
| 7,443,570 B2 | 10/2008 | Chopra et al. | |
| 7,672,037 B2 * | 3/2010 | You et al. | 359/296 |
| 2007/0103428 A1 | 5/2007 | Kazmaier et al. | |
| 2007/0205979 A1 | 9/2007 | Bigelow et al. | |
| 2007/0268245 A1 | 11/2007 | Sugita et al. | |
| 2008/0100906 A1 | 5/2008 | Iftime et al. | |
| 2008/0261159 A1 | 10/2008 | Chopra et al. | |

OTHER PUBLICATIONS

Lenssen, Kars-Michiel H., et al., "Novel Design for Full-Color Electronic Paper", Philips Research Laboratories, SID 08 Digest (2008), vol. 46.1, pp. 685-688.
Kishi, E., et al., "Development on In-Plane EPD", Canon Research Center, SID 00 Digest (2000), vol. 5.1, pp. 24-27.
Swanson, Sally A., et al., "High Performance Electrophoretic Displays", IBM Almaden Research Center, SID 00 Digest (2000), vol. 5.2, pp. 29-31.

* cited by examiner

*Primary Examiner* — Ricky L Mack
*Assistant Examiner* — Tuyen Q Tra

(57) ABSTRACT

A display system encompasses electrodes that induce a convective flow of a carrier fluid that transports a colorant species that is suspended in the carrier fluid. At least one of the convection flow, speed, and direction of the colorant species is controlled by operation of the electrodes.

18 Claims, 14 Drawing Sheets

ELECTRO-OPTICAL DISPLAY

BACKGROUND

Electrophoresis is the translation of charged objects in a fluid in response to an electric field. Electrophoretic inks are useful as a medium to enable bistable, low power types of displays. Electrophoretic displays have been developed using a dyed fluid and white particles sandwiched between parallel electrodes on top and bottom substrates. When an electric field is applied transverse to the substrates across the dyed fluid to translate the white particles to the viewing surface, the display appears white. When the electric field is reversed to translate the white particles away from the viewing surface, the display appears the color of the dyed fluid. Similarly, electrophoretic displays have also been developed using a clear fluid with two differently colored particles of opposite charge (e.g., positively charged white particles and negatively charged black particles) sandwiched between parallel electrodes on top and bottom substrates. When the electrode on the viewing side is charged negatively, the positively charged white particles are translated to the viewing surface, and the display appears white. When the electrode on the viewing side is charged positively, the negatively charged black particles are translated to the viewing surface, and the display appears black. The prior embodiments using parallel electrodes to translate particles transverse to the top and bottom substrates do not enable a transparent state. When the top surface is color A, then the bottom surface will appear color B, and vice versa.

A transparent state can be enabled by "in-plane" electrophoretic displays, in which electrodes are arranged to apply electric fields that are substantially parallel to the substrates to translate colorant particles through a clear fluid parallel to the substrates. This allows the colorant particles to be collected out of the viewing area of the display to create a transparent state. The colorant particles can also be spread across the viewing area of the display to create a colored state. Since the travel distances required for in-plane electrophoretic displays are typically much larger, the switching speeds are typically much slower. Reducing the travel distance is limited by the clear aperture of the viewing area for a given electrode width.

The application of electrophoretic inks in such displays has been hampered by limited mobility and uncontrolled hydrodynamic instability, both of which contribute to slow switching speeds. For in-plane electrophoretic displays, additional challenges include tightly compacting pigments when they are collected out of the viewing area and completely clearing them out of the viewing area to provide good contrast and brightness.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure. It is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

The present embodiments encompass display elements having an energy gradient that induces a convective flow according to a defined pattern. The convective flow can be controlled so as to move a colorant species that is affected by such an energy source. The energy gradient can be induced by methods including mechanical force, a temperature gradient, a chemical potential gradient, a concentration gradient, as well as other disturbances. The present embodiments can be manifested in an electro-optical application where a means for inducing a convective flow includes electrodes, electrokinetic elements, heating elements, microfluidic elements, micro-electromechanical elements, or chemical reactions. Means for controlling the convective flow (e.g., a patterned dielectric layer to expose part of the electrodes) provides an energy transfer, such as charge transfer, to control the convective flow of the colorant species and thus the speed and direction of the species.

The display elements subsequently described use both out-of-plane movement as well as in-plane movement of colorant particles to provide the desired optical appearance. Electrokinetic principles of electro-convection and electrophoresis are used for an electro-optical display to move charged colorant particles in a carrier fluid within a display element. A display element can be a pixel, a sub-pixel, a super-pixel, a segment, or other display element as subsequently described.

In general, a colorant particle may have a size between several nanometers and several microns and has the property of changing the spectral composition of the incident light by absorbing and/or scattering certain portions of the spectrum. As a result, the particle appears colored which provides a desired optical effect. In other embodiments, the colorant can be a dye, that is comprised of single absorbing molecules.

Figure 1:
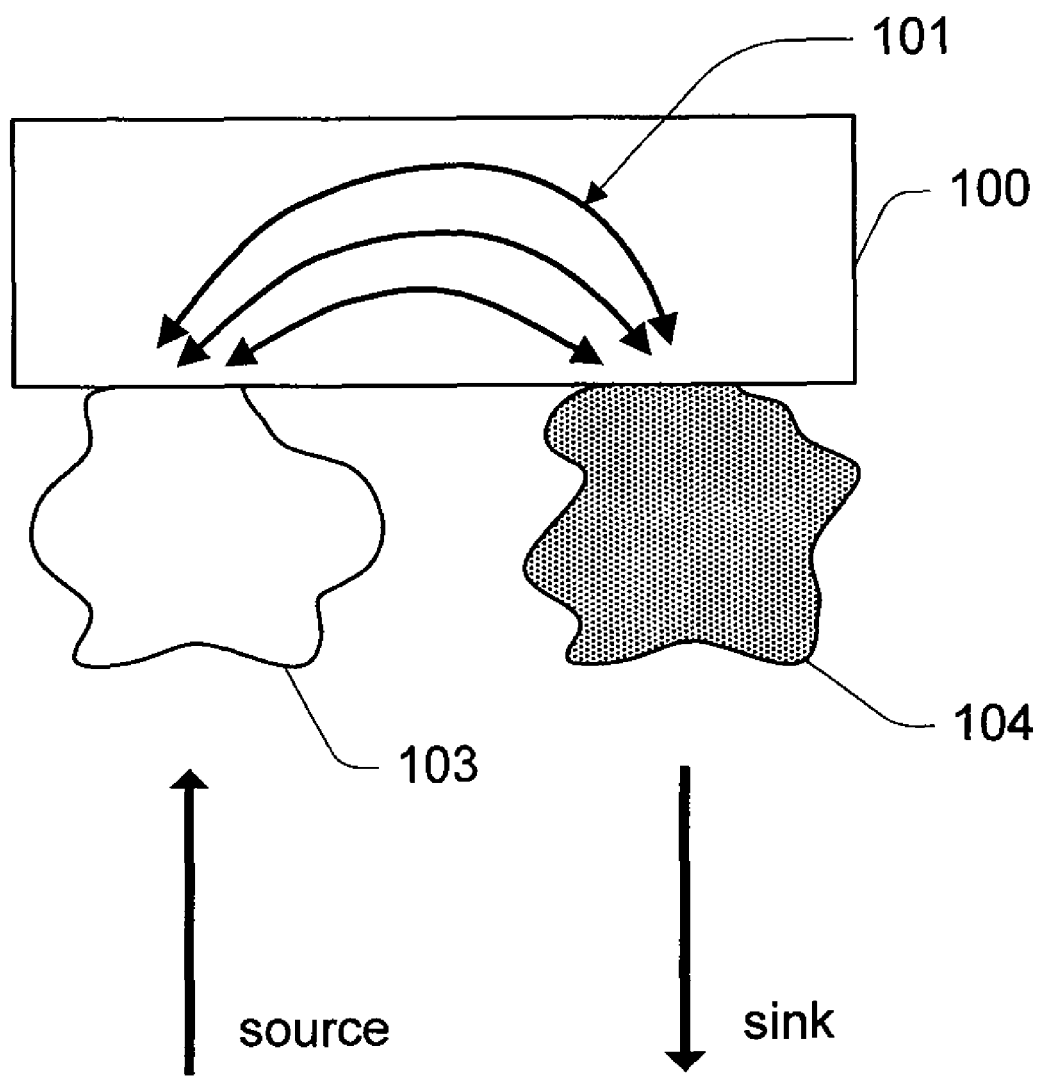
FIG. 1 depicts a conceptual diagram of convective flow of colorant particles in a fluid in multiple embodiments of an electro-optical display

FIG. 1 illustrates a conceptual diagram of one embodiment of convective flow of colorant particles in a carrier fluid in an electro-optical display element. The display element can be a segment, a pixel, a sub-pixel, or a super pixel (i.e., more than one pixel). The element is comprised of a source 103 from which the colorant particles enter the element display volume 100 and a sink 104 to which the colorant particles flow. During element operation, the roles of source and sink can be reversed. In other words, the source can become the sink and vice versa. The flow lines 101 illustrate the movement of the colorant particles from the source 103 to the sink 104 as described by the convective movement of the carrier fluid.

The convective currents of the display element can be generated in numerous ways. Convection is macroscopic movement of molecules in fluids including liquids and gases. Convection is generated by unbalanced volumetric forces inside the fluids that cause different parts of the fluid to move relative to each other producing convective currents. Convection can occur under gravity if different parts of the fluid have different density caused, for example, by localized heating. Convection can also occur if there are pressure or concentration gradients inside the fluid produced by localized chemical reactions, localized heating, or other disturbances. Convection can also occur if there are ionic currents in the fluid caused by external electric fields (AC or DC) and charge injection into the fluid. The moving ions then create the pressure gradient through viscous drag and excluded volume effects. Such convection is typically termed electro-convection.

Figure 2A:
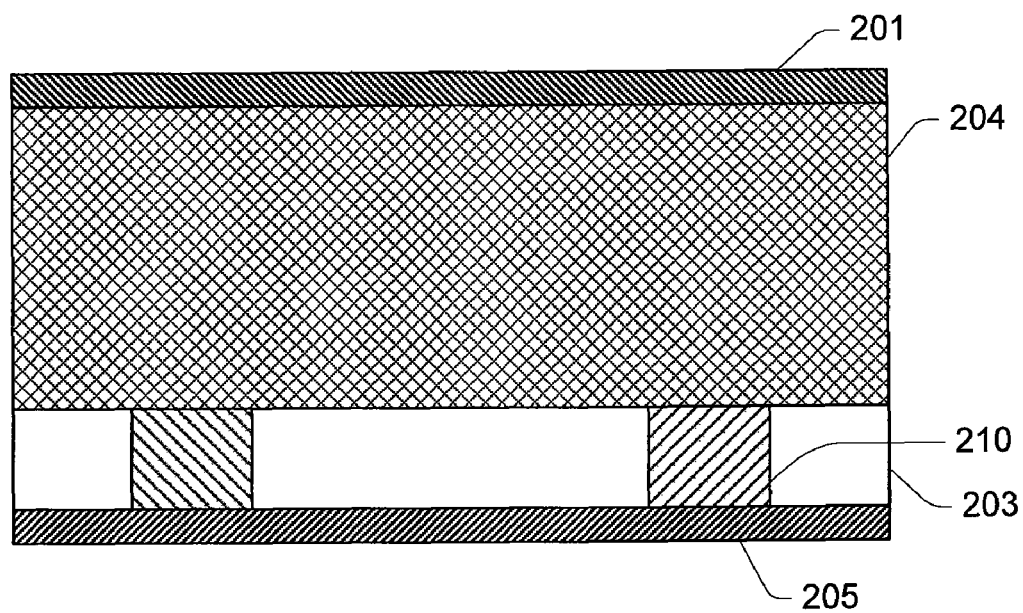
FIGS. 2A and 2B depict cross-sectional views of a dark state and a clear state of the electro-optical display used in multiple embodiments.
Figure 2B:
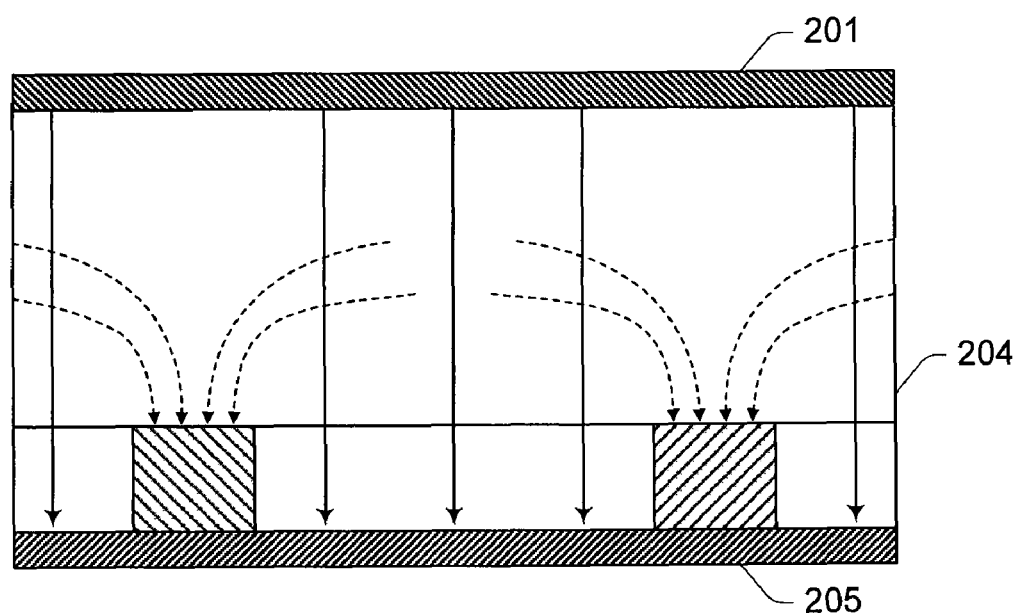

FIGS. 2A and 2B illustrate one example of a method for generating the convective flow within the display element. FIG. 2A illustrates the display element in a dark state. FIG. 2B illustrates the display element in a clear state. Both figures use a transparent top electrode 201 as the conceptual "source" of FIG. 1 and another electrode 205 as the conceptual "sink" of FIG. 1. While the "source" electrode 201 of FIG. 2 is subsequently described as being transparent, the present embodiments are not required to have both electrodes as being transparent. One of either the "source" or the "sink" electrodes can be comprised of an opaque material.

The embodiment of FIGS. 2A and 2B, as well as subsequently described embodiments, is comprised of a "sink" electrode 205 formed on a substrate that, in one embodiment, is coated with a continuous film of transparent conductive material. The transparent conductive material can include carbon nanotube layers, a transparent conducting oxide such as ITO (Indium Tin Oxide), or a transparent conducting polymer such as PEDOT (poly 3,4-ethylenedioxythiophene). Alternate embodiments can use other materials that provide suitable conductivity and transparency for the device.

In an alternate embodiment, the substrate can be coated with or comprised of a reflective material. In yet another embodiment, the substrate can be an opaque material. In still another embodiment, a light scatterer can be formed on the dielectric material.

A layer of transparent electrically insulating material 203 (i.e., dielectric) is deposited on the bottom electrode 205. The dielectric 203 is patterned to create recessed regions 210 in the dielectric 203 on the electrode 205.

The recessed regions can be manufactured by many different processes. These processes include embossing or imprinting with a master or stamp or etching of the dielectric layer 203. The recessed regions can be any size and/or shape.

In a different embodiment, electrodes are only defined within the recessed regions of the dielectric layer. In such an embodiment, the dielectric layer 203 is deposited and patterned on top of the insulating substrate first, and then the electrodes are formed inside the recess areas, for example by electroless deposition or by another suitable method. In an alternate embodiment, the bottom electrode layer 205 is patterned into a collection of electrodes first, and then the dielectric layer 203 is deposited and the recess areas 210 are formed directly on top of the electrodes. The alignment for the latter operation can be achieved for example by photolithography.

The display element is completed by the formation of the transparent "source" electrode 201 that is formed a fixed distance apart from the dielectric layer 203 to thus form the display volume 204 that holds the carrier fluid. The "source" electrode 201 is held at the fixed distance by a network of mechanical stops (not shown) that may include posts, walls, and/or spacer beads. The mechanical stops may be formed by embossing, imprinting, molding, or photolithography of materials such as photoresists or embossing resins.

The carrier fluid of FIGS. 2A and 2B, as well as the subsequently described embodiments, can include either polar fluids (e.g. water) and non-polar fluids (e.g., dodecane). Additionally, anisotropic fluids such as liquid crystal can be used. The fluid may include surfactants such as salts, charging agents, stabilizers, and dispersants. In one embodiment, the surfactants provide a fluid that is an electrolyte that is able to sustain current by ionic mass transport.

The colorant particles in the carrier fluid are comprised of a charged material in the case of an electro-convective display. The colorant particle material should be able to hold a stable charge indefinitely so that repeated operation of the element does not affect the charge on the colorant particles. However, colorant particle materials having a finite ability to hold a stable charge can be used in accordance with the various embodiments while they maintain their charge.

In the dark state of the element, illustrated in FIG. 2A, the colorant particles are relatively uniformly distributed across the element's display volume 204 to absorb the incident light and create the dark optical appearance. The colorant particles may or may not be prevented from occupying one or more recess regions 210 in the dielectric layer 203.

To switch the element, an electric potential difference V is applied between the two electrodes 201, 205. This results in a clearing of the main aperture of the element as illustrated in FIG. 2B. Transverse solid lines of arrows indicate electric field lines and arrows leading into the recess regions indicate the flow of colorant particles following the electrostatic and convective flows. Having the colorant particles compacted in the recess regions is subsequently referred to as the clear state.

Even though the electrical potential difference causes the ionic and convective flow of the fluid, the charged colorant particles do not follow the electric field lines (the solid lines). The charged colorant particles actually follow the lines of convective flow as shown by the dashed lines of FIG. 2B. In this regard, the flow is not totally electrophoretic. Under purely electrophoretic flow, the colorant particles would be pulled down vertically until stopped at the top boundary of the dielectric but would not generally move in-plane.

In one embodiment, the convective flow is induced by ionic mass transport in the carrier fluid and charge transfer between the carrier fluid and the electrodes. The charge transfer can occur when the carrier fluid is coupled to the electrodes either through direct contact with the electrodes or separated from the electrodes by an intermediate layer comprising one or more materials. In the latter case, charge transfer is facilitated by the internal electrical conductivity of the intermediate layer, either volumetric or via pinholes and other defects.

In an alternate embodiment, the convective flow is a transient effect caused by the ionic mass transport in the carrier fluid, but without charge transfer between the carrier fluid and the electrode. In this case, the convective flow proceeds for a finite amount of time and facilitates the compaction of the colorant particles in the recess areas. After that the colorant particles are contained in the recesses by electrostatic forces generated by a coupling with the electrodes.

To switch the display element from the clear state to the dark state, the polarity of the voltage is reversed. This induces convective flow in the opposite direction and the colorant particles are no longer electrically contained in the recesses. As a result, the colorant particles are mass transported to the display volume and then spread relatively evenly throughout the display volume.

Convection within the display element can also be induced by other means. For example, convective flow can be induced by an electrokinetic means, a mechanical means (e.g., mechanical pistons), temperature gradients (e.g., heating of the sources and sinks, focused radiation), chemical potential gradients, as well as other means.

The depth of the recesses in the dielectric layer can be defined by the following equation:

$$h_m = \frac{L}{L_m - L} \cdot \frac{d}{1 - P}$$

where L is the colorant particle load by volume, $L_m$ is the maximum closed packed colorant particle load by volume, d is the thickness of the main element display volume and P is the aperture ratio defined by $1 - A_0/A$. The quantity A is the area of the element display volume while $A_0$ is the recess area. The total area of the defined recess regions of the first or second electrodes is sufficiently less than the area of the display element to provide optical contrast between the collected particle state and the spread particle state.

In one embodiment, the total area of the defined recess regions of the first or second electrodes is between 1% and 10% of the area of the display element, in order to maximize the optical contrast between the clear and the dark states. However, the present embodiments are not limited to any predefined aperture ratio. For example, an alternate embodiment might have a total area of the recessed regions being between 10% and 20% of the area of the display element. Still another embodiment might have a total area of the recessed regions being between 20% and 50% of the area of the display element. Other embodiments might have a total area of the recessed regions being >50% of the area of the display element for embodiments where low optical contrast is required.

In additional embodiments, a grey scale of the display element can be controlled by one of: an aperture ratio, a density of recess regions that are electrically active, or a depth of recess regions that are electrically active. These approaches enable geometrical control over how the colorant particles are spread throughout the display volume and collected in the recess regions through variations in the sizes of the recess regions, the spacing between the recess regions, and the depth of the recess regions.

In one embodiment, the aperture ratio P and the recess depth can be adjusted to maximize the optical contrast between the clear and the dark states.

The present embodiments subsequently refer to a dot structure for the recess regions or other methods for selectively patterning the dielectric on at least one of the electrodes. A dot, for purposes of the present embodiments, can be any shape and/or size as long as it satisfies the requirements for the optical contrast and other characteristics of the display element.

Figure 3A:
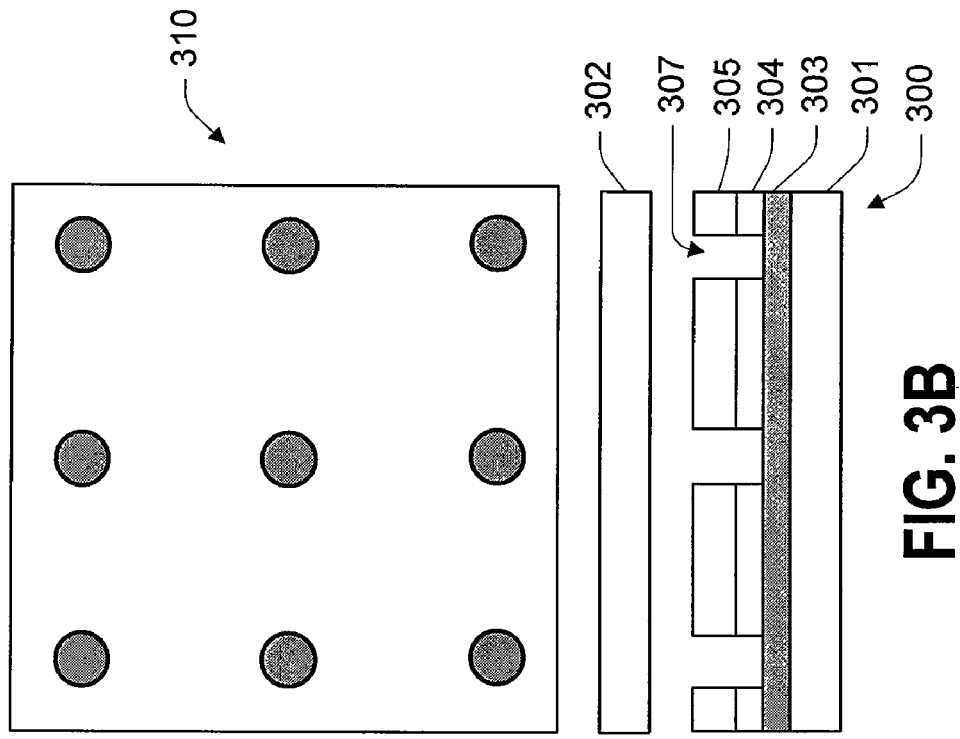
FIGS. 3A and 3B depict two embodiments of a dot structure for a display.

FIG. 3A illustrates a dot structure for a display. This figure shows the top view 310 and cross-sectional view 300 of a display element. In alternate embodiments, FIG. 3 shows a segment, a sub-pixel or a super-pixel.

The display element of FIG. 3 illustrates a periodic distribution of dots. Each dot is a recess region 307 patterned into the dielectric layer 305 to connect the display element display volume to the bottom electrode layer 303. In the illustrated embodiment, the bottom electrode layer 303 is a blanket electrode formed on a substrate material 301. A top electrode 302 is formed over the display volume.

Figure 3B:
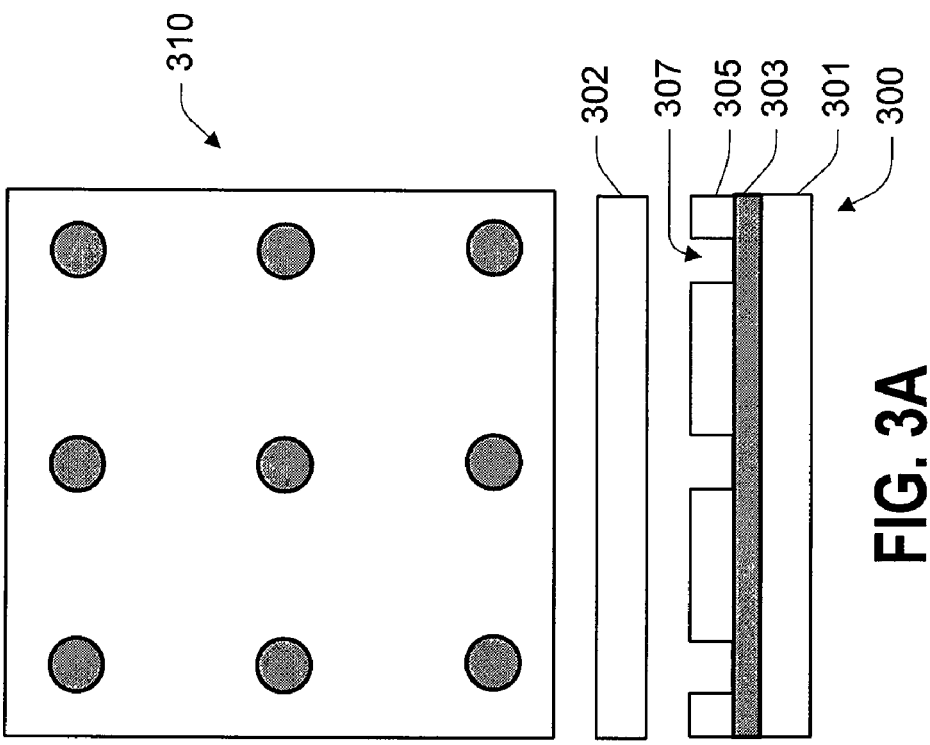

FIG. 3B illustrates another embodiment of a dot structure for a display. This figure illustrates a reflective pixel device with a reflector 304 on top of an opaque electrode 303. The reflector may also be on top of the dielectric layer 305.

Figure 4:
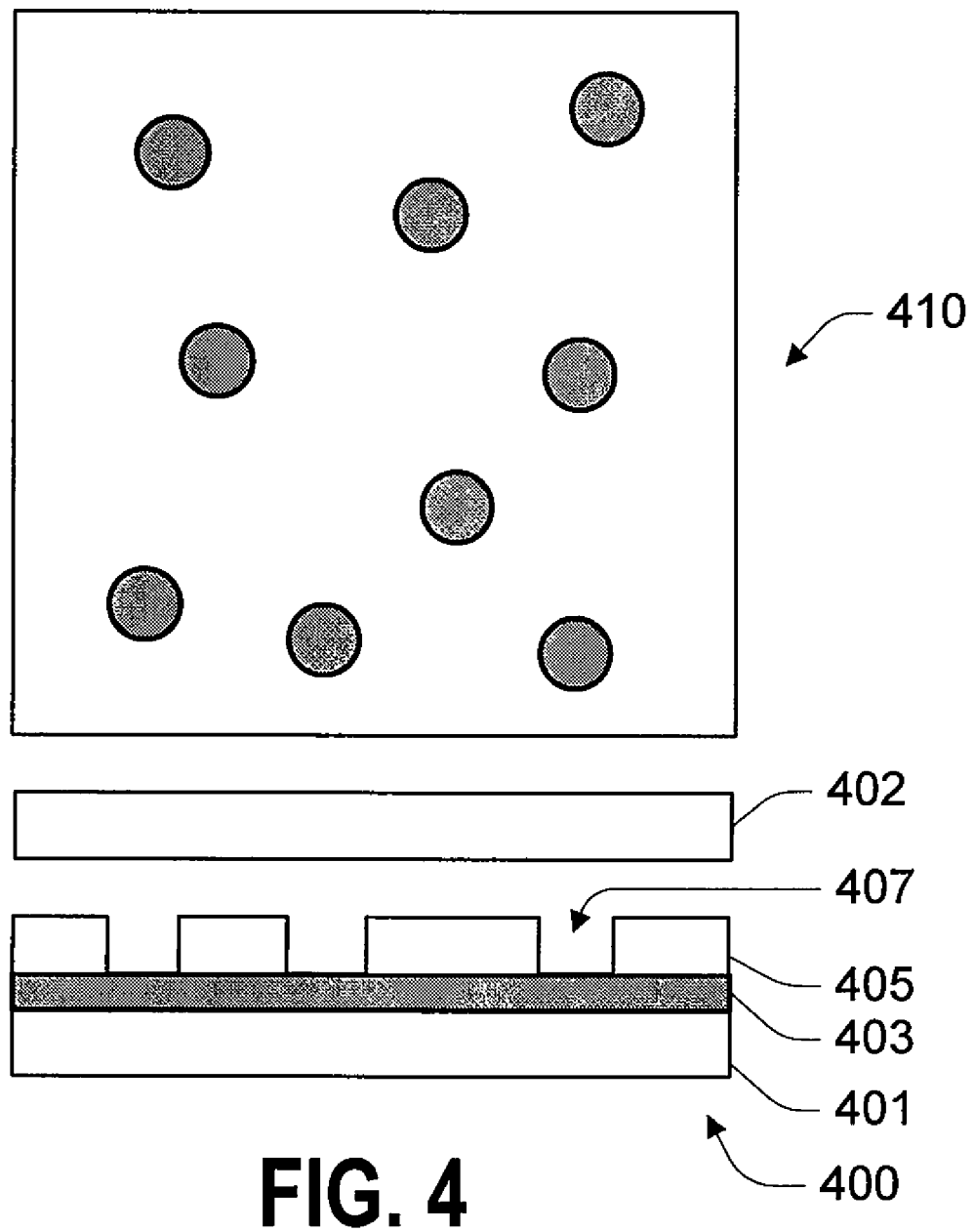
FIG. 4 depicts another embodiment of a dot structure for a display.

FIG. 4 illustrates another embodiment of a dot structure for a display. This figure shows the top view 410 and cross-sectional view 400 of an aperiodic distribution of dots. The aperiodic embodiment comprises a random distribution of recess regions 407 patterned into the dielectric layer 405 that is formed over a blanket electrode 403. The blanket electrode 403 is formed on a substrate 401. A top electrode 402 is formed over the display volume.

The present embodiments are not limited to distribution of the dot structures as illustrated in FIGS. 3 and 4. The dot structures can be arranged in periodic lattice patterns with available two dimensional lattice symmetries (e.g., square, rectangular, hexagonal) as well as any aperiodic or stochastic patterns that distribute across the area of the display element.

Figure 5:
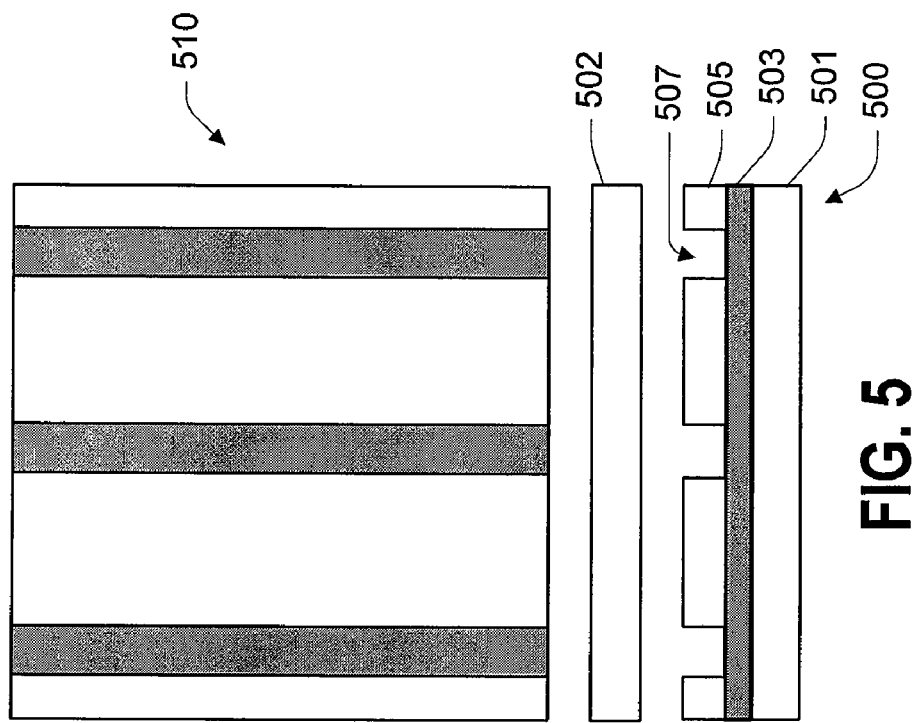
FIG. 5 depicts one embodiment of a line structure for a display.

FIG. 5 illustrates a top view 510 and a cross-sectional view 500 of one embodiment of a line structure for a display. The embodiment of FIG. 5 employs a periodic distribution of the lines. The lines are formed by patterning line recess regions 507 into a dielectric layer 505 formed on a blanket electrode layer 503 that is formed on a substrate 501. As in other embodiments, the line recess regions can be patterned into the dielectric layer 505 using embossing, photolithography, or some other means for forming recess regions through the dielectric layer. A top electrode 502 is formed over the display volume.

Figure 6:
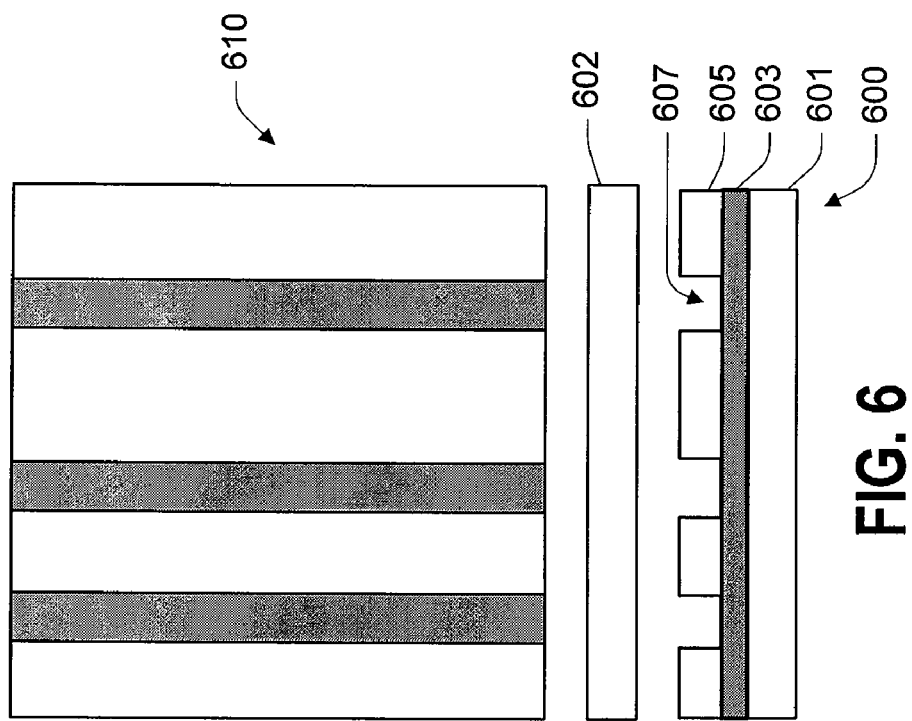
FIG. 6 depicts another embodiment of a line structure for a display.

FIG. 6 illustrates a top view 610 and a cross-sectional view 600 of an aperiodic distribution of a line structure for a display. The lines are formed by patterning line recess regions 607 into a dielectric layer 605 formed on a blanket electrode layer 603 that is formed on a substrate 601. A top electrode 602 is formed over the display volume.

The recess regions have been shown as either circles or lines. However, the present embodiments are not limited in either shape or size of the recesses as long as they satisfy the aperture, optical contrast and other operating requirements of the display element. They can be formed in circles, triangles, squares, rectangles, diamonds, stars, cones, inverse pyramids, or any other shape. Similarly, there is no requirement that all of the recess regions be the same size. The recess regions can be sized such that size varies in either a periodic or an aperiodic stochastic fashion. The recess regions can also be randomly sized in a single segment or pixel. The dielectric layer can be patterned with multiple dimensional shapes or fractal shapes. This patterning includes patterning the dielectric layer to block some dots that need to be inactive.

Dot structures that are small compared to the area of the display element can be considered zero dimensional shapes. Line structures that have one dimension substantially larger than the other can be considered one dimensional shapes. Recess regions with a cross-sectional area that is significant compared to the area of the display element can be considered two dimensional areas. Recess regions with non-vertical walls as well as features with protrusions into the display element volume can be considered three dimensional shapes.

Figure 10:
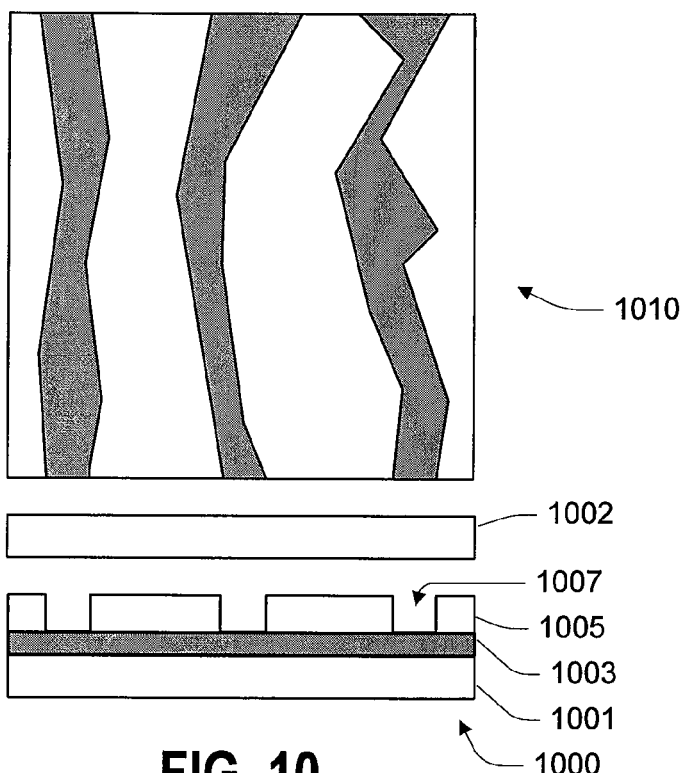
FIG. 10 depicts an additional embodiment of a line structure.

FIG. 10 illustrates a top view 1010 and a cross-sectional view 1000 of another embodiment of a line-type structure for a display. This embodiment employs not only an aperiodic distribution of "lines", but the "lines" are also distorted. As in the other embodiments, the "lines" are formed by patterning recessed areas 1007 into a dielectric layer 1005 formed on a blanket electrode layer 1003 that is formed on a substrate 1001. A top electrode 1002 is formed over the display volume.

Figure 7:
FIG. 7 depicts a cross-sectional view of one embodiment of a display in the clear state.

FIG. 7 illustrates a cross-sectional view of one embodiment of a display element in the clear state showing both the top electrode 702 and the bottom electrode 701. As in the above-described embodiments, the bottom electrode 701 is a blanket electrode formed on a substrate 704. A patterned dielectric layer 705 is formed on the bottom electrode 701. The dielectric layer 705 is patterned with the recess regions 709 that allow the charged colorant particles to compact.

The top electrode 702 is formed on a transparent material 707. The top electrode can be used to control the colorant particle distributions, either with a uniform, segmented, or pixelated top electrode as shown and described subsequently with reference to FIG. 9.

Figure 8:
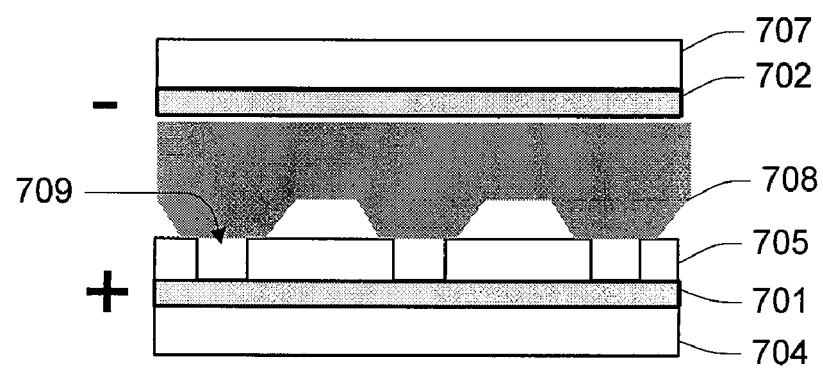
FIG. 8 depicts a cross-sectional view of one embodiment of a display in the dark state.
Figure 9:
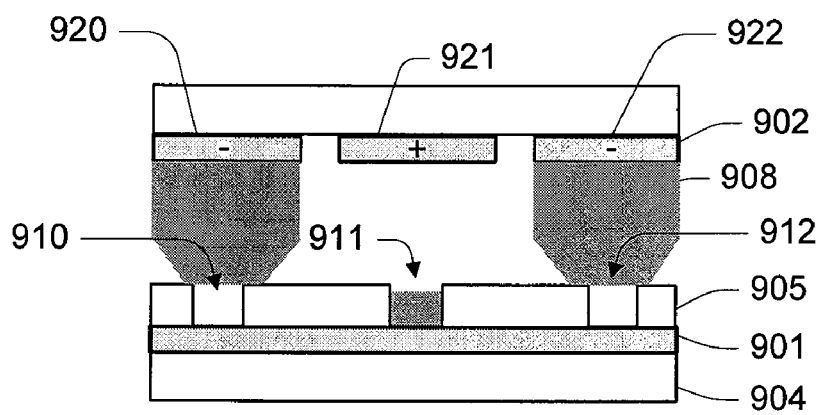
FIG. 9 depicts a cross-sectional view of one embodiment of a display having a segmented or pixelated top electrode.

As an example of operation, positively charged ink can be electrophoretically and convectively moved to the bottom electrode, compacted into the recess regions 709, and held there by a negative bias in the clear state. This results in a clear aperture. During a dark state, illustrated in FIG. 8, the positive bias on the bottom electrodes repels the positively charge colorant particles out of the recess regions into the carrier fluid in the display volume 708. In addition, the convective currents speed up the movement of particles and disburse the particles across the display volume FIG. 9 shows a cross-sectional view of one embodiment of adjacent display elements in the light and dark states having a blanket bottom electrode 901 and a segmented or pixelated top electrode 902. As in other embodiments, the blanket bottom electrode is formed on substrate 904 and a patterned dielectric layer 905 is formed on the bottom electrode 901.

Each recess region 910-912 patterned into the dielectric layer 905 is formed under a corresponding segmented or pixelated portion 920-922 of the top electrode. The segmented or pixelated portions 920-922 of the top electrode 902 are electrically disconnected thus allowing each corresponding segmented or pixelated portion 920-922 to have a different polarity than an adjacent portion 920-922. There may be multiple recess regions under each corresponding segmented or pixelated portion 920-922 on the top electrode but, for simplicity, only one recess region is shown under each segmented or pixelated portion 920-922 in the figure.

In operation, assuming that the colorant particles are positively charged, if a negative voltage is applied to the top segmented or pixelated portions 920 and 922 of the top electrode 902, the colorant particles are attracted out of the recess regions into the carrier fluid in the display volume 908. However, the center segmented or pixelated portion 921 of the top electrode 902 has a positive voltage and thus the colorant particles are compacted in the recess regions making that portion of the segment or pixel clear. This method can be used to control the state of each segment or pixel.

FIG. 9 shows that the top electrode is segmented or pixelated. In an alternate embodiment, the bottom electrode can be segmented or pixelated instead. In yet another embodiment, both the top and bottom electrodes can be segmented or pixelated.

In another embodiment, one or more additional electrodes can be formed between the top and bottom electrodes. Such additional electrodes can be used to shape the electric fields and control the translation of colorant particles.

Figure 11:
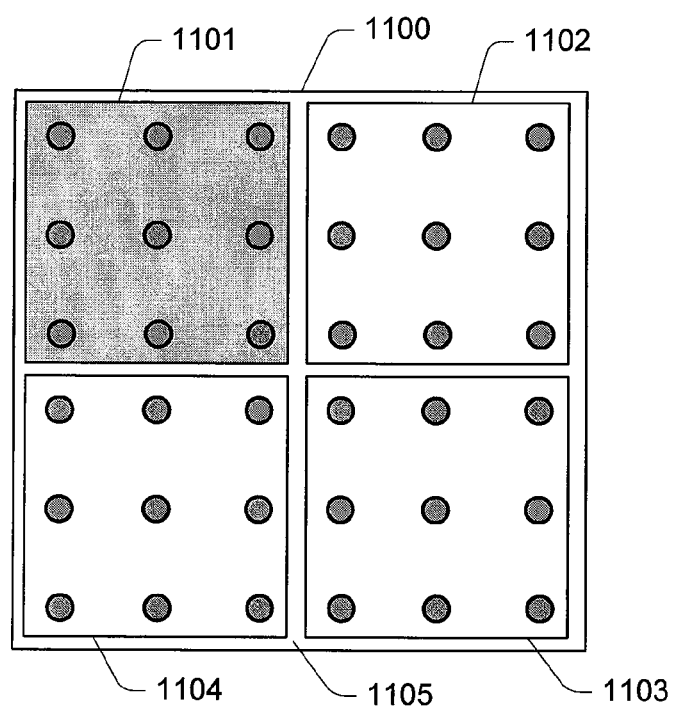
FIG. 11 depicts a multiple color, segmented display of one embodiment with top and bottom electrodes.

FIG. 11 illustrates one embodiment of a multiple color, segmented display with top and bottom electrodes. The illustrated example is segmented into four separate segments 1101-1104. In one embodiment, these segments 1101-1104 are formed in the bottom electrode 1100 and the top electrode 1105 is uniform. Different colored colorant particles can then be controlled with oppositely biased top 1105 or bottom 1100 electrodes.

For example, if magenta colorant particles had a positive charge and black colorant particles had a negative charge, by changing the polarity of the voltage applied to any one segment 1101-1104, the movement of the different colored inks can be controlled. One segment 1101 might have a positive polarity and thus repel the magenta colorant particles from the recess regions in that segment 1101 while compacting the black colorant particles in the recess regions in that segment 1101. The one segment 1101 would thus appear magenta. The remaining segments 1102-1104 could then all have negative polarity voltages and thus repel the black colorant particles from the recess regions in those segments 1102-1104 while compacting the magenta colorant particles in the recess regions in those segments 1102-1104. The remaining segments 1102-1104 would thus appear black.

Using different polarity colorant particles of different colors can be used in any of the embodiments described herein in order to control the color of a display element. One color would be repelled by the bottom electrode with the same polarity while the second color would be attracted to the bottom electrode and compacted into the recess regions. The repelled colorant particles would then determine the color of the pixel. Gradual change from one color to another color in the display element can be controlled by the spreading ratio between the two colorants.

Figure 12A:
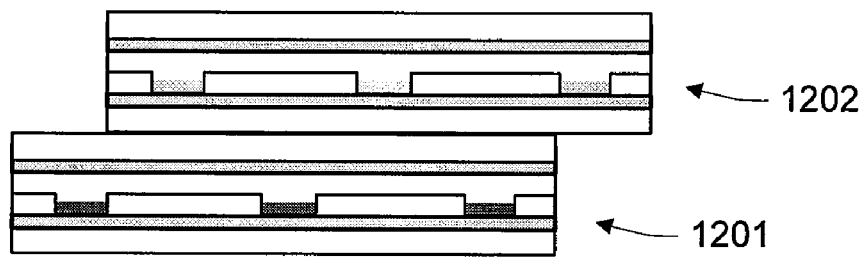
FIGS. 12A-12D depict cross-sectional and top views of embodiments of stacked display elements.
Figure 12B:
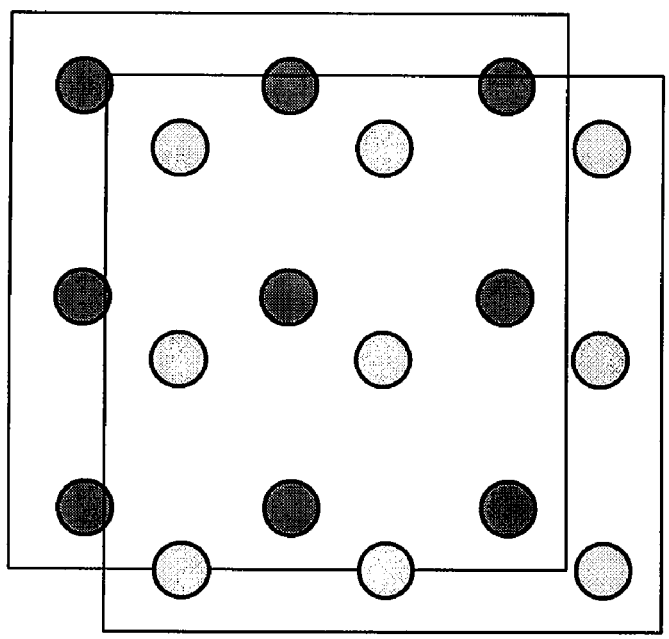

FIGS. 12A and 12B illustrate a cross-sectional view and a top view of one embodiment of stacked display elements. As shown in FIG. 12A, the stacked display elements 1201, 1202 can be any of the embodiments previously described. Stacking of the dot structured display elements provides a large enough clear aperture so that it may be possible to stack multiple layers without the need for alignment. For example, overlapping two stacks 1201, 1202 of 95% aperture may result in over 90% clear aperture thus resulting in a cost savings associated with precision alignment during manufacture. The top view of FIG. 12B shows the limited aperture lost by the offset dot structure of each pixel.

Figure 12C:
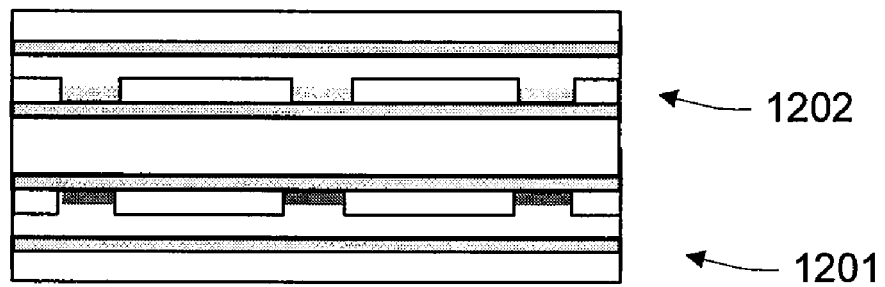
Figure 12D:
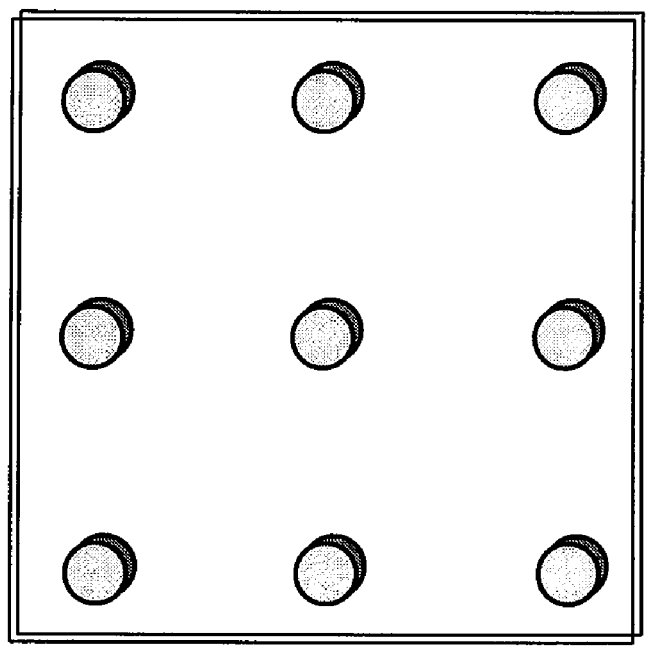

FIGS. 12C and 12D illustrate a cross-sectional view and a top view of another embodiment of stacked display elements. In this embodiment, the dot structured display elements 1201, 1202 are stacked so that the dot structures are aligned. In contrast to the embodiment of FIGS. 12A and 12B, FIG. 12C shows that this embodiment is formed by defining aligned dot structures on both sides of the interior substrate between two layers. In alternate embodiment, both sides of the dot structures may not necessarily align and still provide large enough clear aperture as a transparent display. Each layer can contain colorant particles of a single color or more than one color to provide multi-color display.

The stacking of the segments or pixels as illustrated in FIGS. 12A-12D is not limited to just two layers. A full color display can be obtained by stacking three layers wherein each layer is a subtractive primary light color of magenta, cyan, and yellow. Other embodiments can stack other quantities of layers, including black or white layers.

Figure 13:
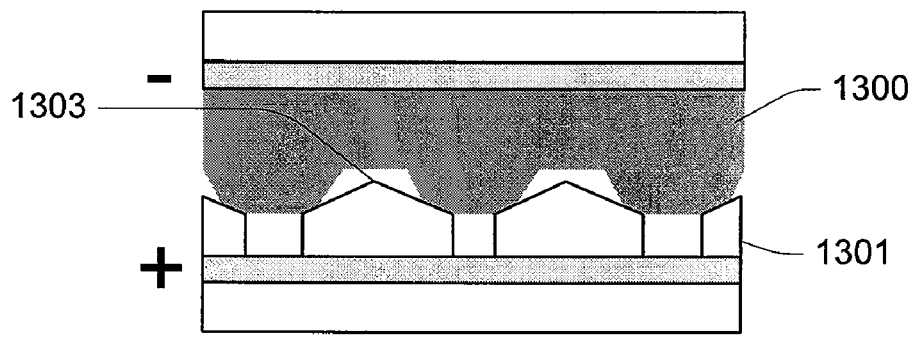
FIG. 13 depicts a cross-sectional view of an alternate embodiment of a dielectric layer in a display.

FIG. 13 illustrates a cross-sectional view of an alternate embodiment of a dielectric layer in a display. In this embodiment, the dielectric layer 1301 is formed with peaks 1303 or other shapes between the dielectric layer and the pixel display volume 1300. Such shapes can help guide the colorant particles into the recess regions when the display element is switched into the clear state and the colorant particles are compacted into the recess regions.

Figure 14:
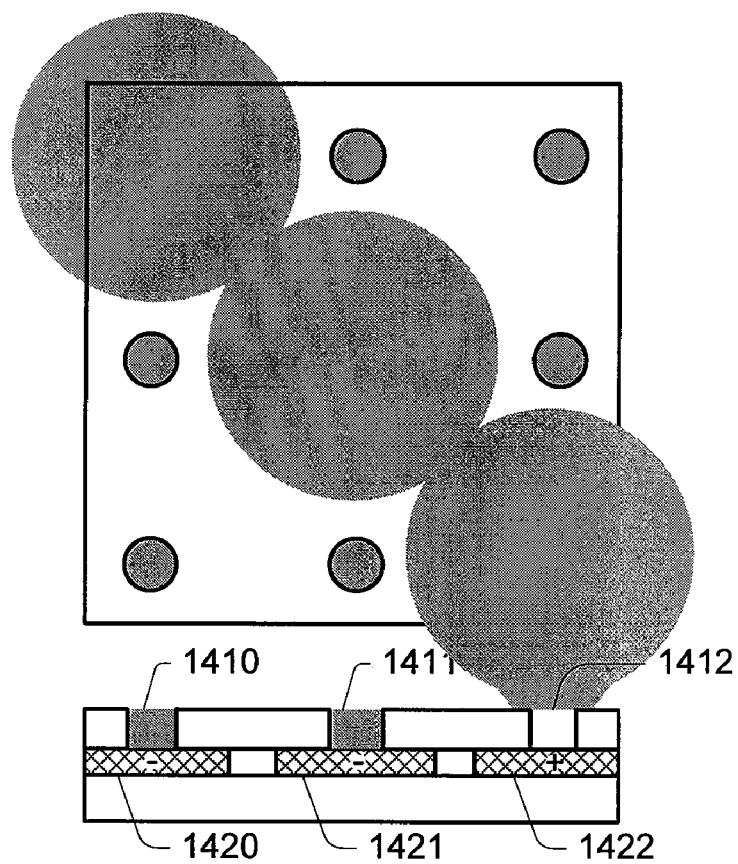
FIG. 14 depicts a top view and a cross-sectional view of an individually addressable segmented or pixelated dot structure of one embodiment.

FIG. 14 illustrates top and cross-sectional views of one embodiment where the dot structures are individually addressable. Individual dots or groups of dots can be biased to attract charged particles of one type while, in some embodiments, repelling another type. The electrode or electrodes can have a mixture of bias conditions within a super pixel in order to control gray scale in a single colorant ink or to control colors from one to the other continuously with dual colorant inks. If 33% of the dot density is activated within a super pixel using positive bias conditions (remaining dots are still negative), if a single colorant ink such as magenta is used, approximately 33% of magenta colorant particles within the super pixel will spread while the remaining will stay within the via of negatively biased electrodes. This method can be used to control gray scale.

The cross-sectional view of FIG. 14 shows three recess regions 1410-1412 patterned into the dielectric layer 1400. Instead of a blanket electrode formed under the dielectric layer 1400, each recess region, or group of recess regions, has an individually addressable electrode 1420-1422. In the illustrated case, the first two electrodes 1420, 1421 are negatively biased and compact the positively charged ink while the remaining electrode 1422 is positively biased to disburse the ink from that recess region. The individually addressable electrodes could also be formed on the top substrate rather than under the dielectric layer.

Another embodiment of a method for gray scale control is a function of voltage amplitude and pulse width. Dynamic modulation of the amplitude and/or pulse width can provide control of the colorant particle density disbursed within each display element.

This embodiment encompasses generating voltage pulses with a pulse width that is less than what the human eye can resolve. The voltage pulses are applied to segmented or pixelated portions of either the top or bottom electrodes to dynamically control the balance between compaction and spreading conditions. Modulation of amplitude (e.g., 0V to a few tens of volts) or pulse width (e.g., 100 ms to a few µs) can provide the desired gray scale by controlling the specific concentration of colorant particles in the viewing region of the display element. Without bias or with repelling bias conditions, colorant particles are in a spread state. With attracting bias conditions, particles are compacted in the recess regions. Intermediate states between complete spreading and complete compaction are achieved when the bias conditions dynamically switch between the two states.

Figure 15:
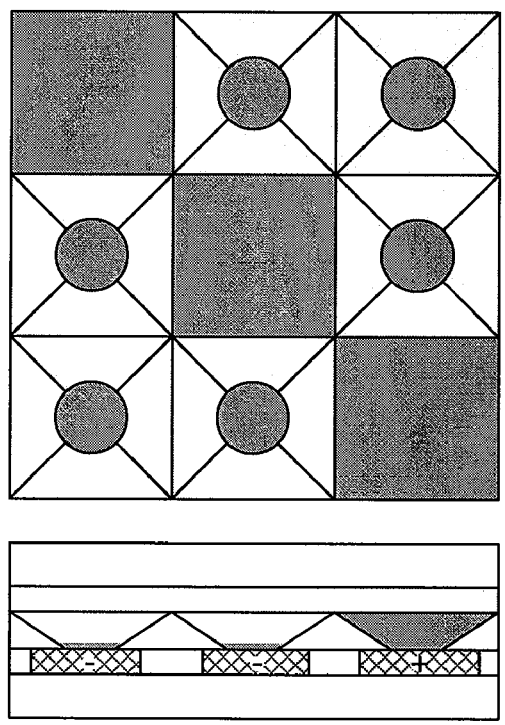
FIG. 15 depicts a top view and a cross-sectional view of an individually addressable dot structure having a pyramidal shaped dielectric layer of one embodiment.

FIG. 15 illustrates top and cross-sectional view of one embodiment where the dot structures are individually addressable and the dielectric layer is patterned with pyramid shaped recess regions. Operation of the embodiment of FIG. 15 is substantially similar to that of FIG. 14. Again, the individually addressable electrodes could also be formed on the top substrate rather than under the dielectric layer.

Figure 16:
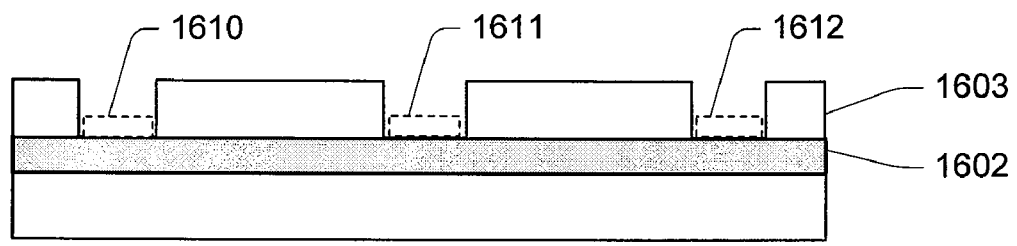
FIG. 16 depicts a cross-sectional view of embodiments using a dot structure with heating elements or micro-electromechanical elements or combination with electrophoretic elements.

FIG. 16 illustrates a cross-sectional view of one embodiment of a dot structure using micro-electromechanical elements or heating elements. In one embodiment, micro-electromechanical elements 1610-1612 are used to move the colorant particles out of the recess regions in the dielectric 1603. In an alternate embodiment, the electrodes and micro-electromechanical elements 1610-1612 are replaced by heating elements 1602 on the top and bottom of the display. These embodiments can be combined with electrophoretic elements to move and control colorant particles more efficiently.

Figure 17:
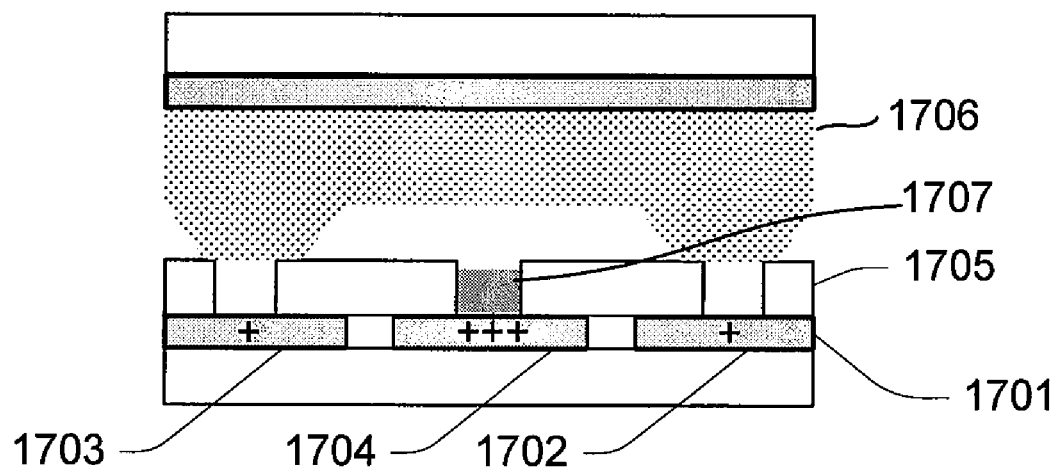
FIG. 17 depicts a cross-sectional view of one embodiment of a segmented or pixelated electrode on the bottom layer.

FIG. 17 illustrates a cross-sectional view of one embodiment of a display element with a segmented or pixelated electrode layer 1701. Such an embodiment can be used in a dual colorant display element wherein a first colorant species 1706 that is positively charged can be controlled by the segmented electrodes 1702, 1703. A second colorant species 1707 that is negatively charged can be controlled by the segmented electrode 1704. A patterned dielectric layer 1705 is formed over the electrode layer 1701. Depending on the voltages applied to the electrodes in the display element, various colors can be achieved. When the segmented electrodes 1702, 1703 are negatively charged and the segmented electrode 1704 is positively charged, the positively charged colorant particles 1706 will be collected into the recess regions above the segmented electrodes 1702, 1703, and the negatively charged colorant particles 1707 will be collected into the recess regions above the segmented electrode 1704. This results in a clear state. When a small positive bias is applied to the segmented electrodes 1702, 1703, the positively charged colorant particles 1706 will be repelled from the recessed regions above the segmented electrodes 1702, 1703, while the negatively charged colorant particles 1707 can be maintained in the recess regions above the segmented electrode 1704 by a larger positive bias. This results in a state that has the color of the first colorant particles 1706 that are positively charged. A state that has the color of the second colorant particles 1707 that are negatively charged can be achieved in a similar way using a small negative bias applied to the segmented electrode 1704 and a larger negative bias applied to the segmented electrodes 1702, 1703.

Figure 18:
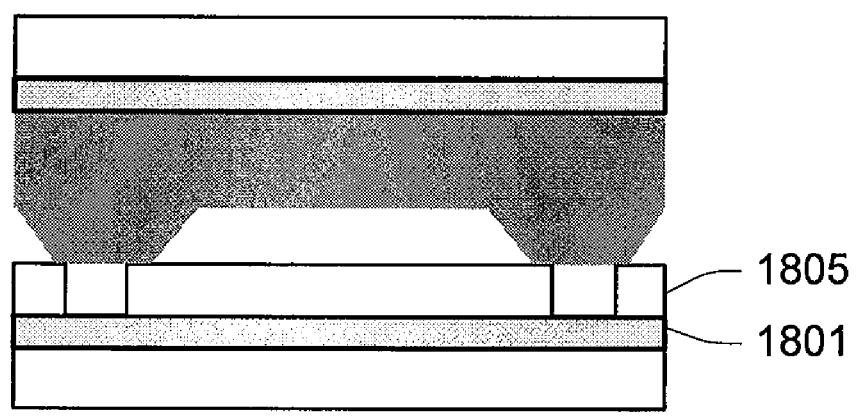
FIG. 18 depicts a cross-sectional view of one embodiment of a blocked dielectric layer for an electronic skin.

FIG. 18 illustrates a cross-sectional view of one embodiment of a display element with a blocked dielectric layer 1805. By selectively blocking the dot patterns of the electrode 1801 using photolithography, embossing, or other discussed methods, static patterns can be made in a way such that only an area with recess regions switches on and off.

Figure 19:
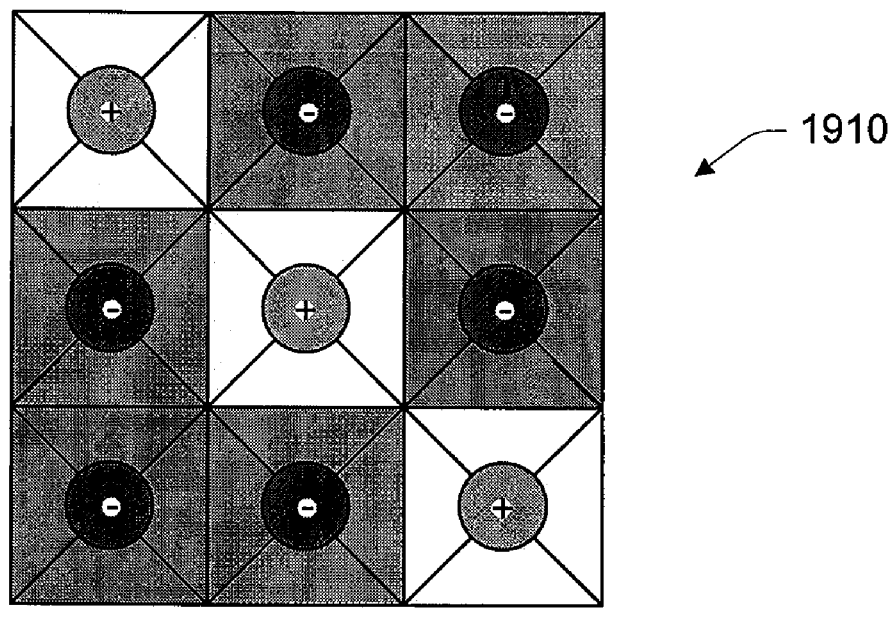
FIG. 19 depicts a cross-sectional view of one embodiment of a dot structure electrode for control of multiple colorants.
Figure 19:
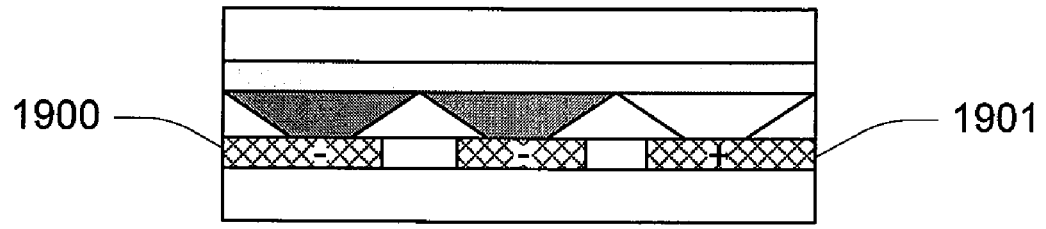

FIG. 19 illustrates one embodiment of a display element with a segmented or pixelated electrode 1901 for controlling multiple colorants. This figure shows both the side view 1900 and the top view 1910 of the display element. In the dual color embodiment, each color would be oppositely charged from the other.

For example, a magenta colorant could be positively charged and a black colorant could be negatively charged. In such an embodiment, 33% of dot density within a display element can be positively biased to spread 33% of the magenta colorant while an equal amount of black colorant will compact onto those dot electrodes. By controlling the ratio of positively or negatively biased electrodes, color within the display element can vary continuously from one type to the other. The dual colorants can be controlled to produce gradual change from one color to another color.

Figure 20:
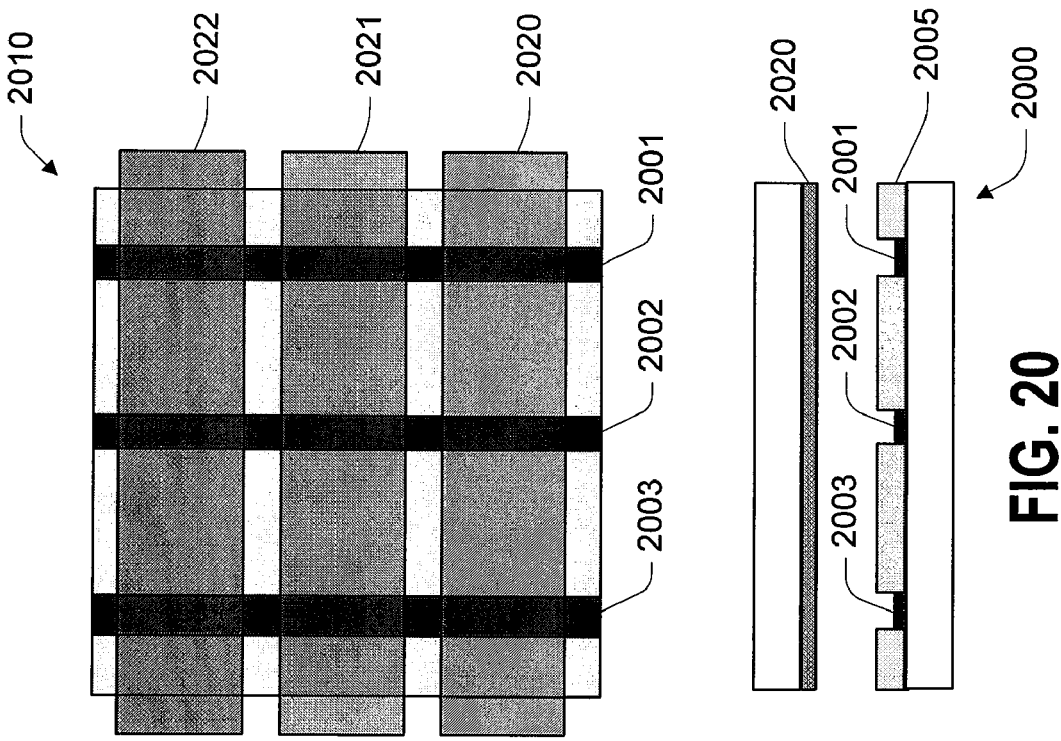
FIG. 20 depicts a cross-sectional view of one embodiment of a line structure display element.

FIG. 20 illustrates one embodiment of a line structure display element. This embodiment shows a side view 2000 and a top view 2010. As in other embodiments, a dielectric layer 2005 is patterned on the bottom. However, this embodiment forms the bottom electrode 2001-2003 within each patterned area of the dielectric layer 2005.

The top electrode 2020-2022 is shown in the top view 2010 as being segmented. The size and shape of both the top electrodes 2020-2022 and the bottom electrodes 2001-2003 are for purposes of illustration only. Alternate embodiments can take other forms.

Figure 21:
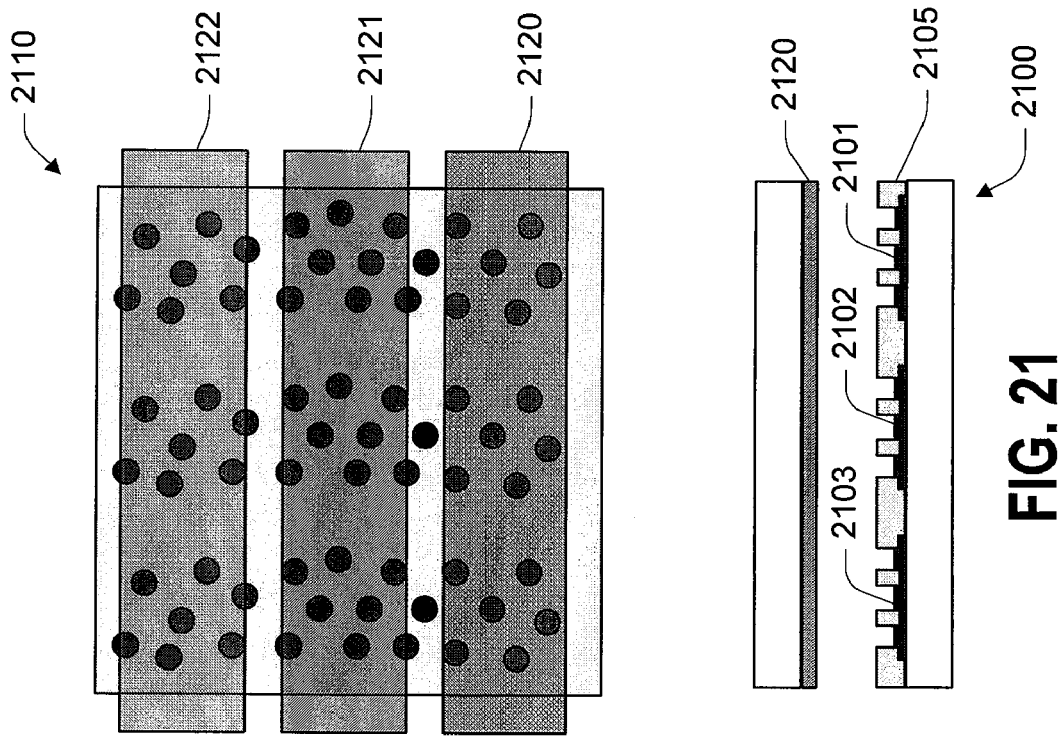
FIG. 21 depicts a cross-sectional view of one embodiment of a dot structure display element.

FIG. 21 illustrates one embodiment of a dot structure for a display element with three segments. This embodiment shows a side view 2100 and a top view 2110. The dielectric layer 2105 is patterned on the bottom. In this embodiment, the dielectric layer 2105 is patterned with a dot structure for electrodes 2101-2103. The top electrodes 2120-2122 are segmented.

In any of the above embodiments, the top and/or the bottom electrodes can be segmented or pixelated and directly driven. This enables control of the colorant particles to achieve gray scale control.

The various embodiments described have advantages over other existing solutions. While the prior art has worked to avoid the use of convection effects in electrophoretic displays, some of the present embodiments use electro-convective principles to achieve in-plane movement of colorant particles within a display to produce dark and clear states in response to parallel electrodes on top and bottom substrates.

What is claimed is:

1. An electro-optical display element comprising:
a first electrode;
a second electrode opposed to the first electrode;
a dielectric layer, formed on at least one of the first or the second electrodes, that is patterned to create defined recessed regions on the first or the second electrodes;
a fluid with colorant particles that is contained between the first and second electrodes;
wherein a voltage applied to the first and second electrodes controls movement of the colorant particles such that a first voltage results in a first optical state by collecting colorant particles near a defined region and a second voltage results in a second optical state by spreading colorant particles into a viewable area of the display element,
wherein the total area of the defined regions of the first or second electrodes is less than 50 percent of the area of the display element such that optical contrast is provided between the first optical state and second optical state.

2. The electro-optical display system of claim 1 wherein the patterned dielectric layer is patterned with defined recessed regions that have a periodic lattice arrangement or an aperiodic stochastic arrangement wherein the defined regions include at least one of dot structures, line structures, two dimensional areas, three dimensional shapes, or fractal shapes, each having a predetermined depth.

3. The electro-optical display system of claim 1 wherein the dielectric layer is patterned to provide at least one of: recess regions with sizes varying in either a periodic or an aperiodic stochastic fashion, blocked regions that are inactive, or electrodes that are only defined within the recessed regions of the dielectric layer.

4. The electro-optical display system of claim 1 wherein at least one of the first or second electrodes is comprised of one of: a transparent conductor or an opaque conductor with reflector or a light scatterer formed on the dielectric layer.

5. The electro-optical display system of claim 1 wherein the colorant particles are comprised of a plurality of different colored colorant particles having at least one charge polarity.

6. The electro-optical display system of claim 1 wherein at least one of the first or second electrodes is segmented or pixelated and a spreading ratio of a plurality of colorant particles within the display element is controlled in response to a change of applied voltage to at least one of the first or second electrodes.

7. The electro-optical display system of claim 1 wherein a grey scale in a viewable area of the display element is controlled by one of: an aperture ratio defined by $1-A_0/A$ where A is the area of the display element and $A_0$ is the total area of the defined regions, a density of recess regions that are electrically active, a depth of recess regions that are electrically active.

8. The electro-optical display system of claim 1 and further comprising one or more additional electrodes formed between the first and second electrodes; wherein the electrodes can be continuous, segmented, or pixelated.

9. The electro-optical display system of claim 1 wherein a grey scale in a viewable area of the display element is controlled by dynamic modulation of the voltage amplitude and/or voltage pulse width applied to at least one of the first or second electrodes.

10. The electro-optical display element of claim 1, wherein the total area of the defined regions of the first or second electrodes is between 1 percent and 10 percent of the area of the display element.

11. The electro-optical display element of claim 1, wherein the total area of the defined regions of the first or second electrodes is between 10 percent and 20 percent of the area of the display element.

12. A method for manufacturing a display system, the method comprising:
forming a plurality of stacked display element structures, wherein each display element structure comprises:
forming an electrode;
forming a dielectric layer on the electrode;
patterning the dielectric layer to create defined recess regions on the electrode; and
filling a space above the electrode with a carrier fluid comprising a colorant species;
wherein a total area of the defined recess regions of the electrode is less than 50 percent of an area of the display element to provide optical contrast between first and second optical states.

13. The method of claim 12, wherein the total area of the defined recess regions of the electrode is between 1 percent and 10 percent of the area of the display element.

14. The method of claim 12, wherein the total area of the defined recess regions of the electrode is between 10 percent and 20 percent of the area of the display element.

15. An electro-optical display element comprising:
a first electrode;
a second electrode opposed to the first electrode;
a dielectric layer having recessed regions therein, the dielectric layer disposed over the first electrode; and a fluid with colorant particles that is contained between the first and second electrodes;

wherein the total area of the recessed regions is less than 50 percent of a viewable area of the display element.

16. The electro-optical display element of claim 15, wherein the total area of the recessed regions is between 1 percent and 10 percent of the viewable area of the display element.

17. The electro-optical display element of claim 15, wherein the total area of the recessed regions is between 10 percent and 20 percent of the viewable area of the display element.

18. The electro-optical display element of claim 15, wherein the first electrode is only defined within the recessed regions.

* * * * *